(12) United States Patent
Pelletier et al.

(10) Patent No.: US 11,033,986 B2
(45) Date of Patent: Jun. 15, 2021

(54) SYSTEMS AND METHODS FOR DISSIMILAR MATERIAL WELDING

(71) Applicant: United Technologies Corporation, Farmington, CT (US)

(72) Inventors: Carl E. Pelletier, East Hampton, CT (US); William Bogue, Hebron, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 13 days.

(21) Appl. No.: 16/357,752

(22) Filed: Mar. 19, 2019

(65) Prior Publication Data

US 2020/0023471 A1 Jan. 23, 2020

Related U.S. Application Data

(62) Division of application No. 14/676,476, filed on Apr. 1, 2015.

(Continued)

(51) Int. Cl.
*B23K 31/00* (2006.01)
*B23K 31/02* (2006.01)
(Continued)

(52) U.S. Cl.
CPC ............ *B23K 31/02* (2013.01); *B23K 9/201* (2013.01); *B23K 11/0053* (2013.01);
(Continued)

(58) Field of Classification Search
CPC ............ B23K 2203/18; B23K 2203/26; B23K 26/323; B23K 31/02; B23K 35/3033
See application file for complete search history.

(56) References Cited

U.S. PATENT DOCUMENTS 3,629,544 A * 12/1971 Becker ................ B23K 11/163
219/93
3,848,389 A * 11/1974 Gapp ...................... F16B 19/06
411/504

(Continued)

FOREIGN PATENT DOCUMENTS

DE        9319729        7/1994
DE       19540848        5/1997

(Continued)

OTHER PUBLICATIONS

Song et al. (Microstructural and Mechanical properties of friction stir welding and post-heat-treated Inconel 718 alloy, Journal of Alloys and Compounds, 2010, pp. 144-150) (Year: 2010).*

(Continued)

*Primary Examiner* — Erin B Saad
(74) *Attorney, Agent, or Firm* — Snell & Wilmer L.L.P.

(57) ABSTRACT

A system is provided comprising a hardened stud body and an unhardened stud subunit coupled to the hardened stud body. The hardened stud body may comprise a first composition having by weight between 17% and 21% chromium, between 2.8% and 3.3% molybdenum, between 50% to 55% nickel, and between 4.75% and 5.5% niobium. The unhardened stud subunit may comprise a second composition having by weight between 20% and 23% chromium, between 8% and 10% molybdenum, at least 58% nickel, and between 3.15% and 4.15% niobium.

15 Claims, 3 Drawing Sheets

Related U.S. Application Data

(60) Provisional application No. 62/013,381, filed on Jun. 17, 2014.

(51) Int. Cl.

| | | |
|---|---|---|
| *B23K 20/22* | (2006.01) | |
| *B23K 11/00* | (2006.01) | |
| *B23K 26/323* | (2014.01) | |
| *B23K 20/12* | (2006.01) | |
| *B23K 9/20* | (2006.01) | |
| *B23K 35/02* | (2006.01) | |
| *B23K 11/26* | (2006.01) | |
| *B23K 35/30* | (2006.01) | |
| *C22F 1/10* | (2006.01) | |
| *B23K 103/08* | (2006.01) | |
| *B23K 103/18* | (2006.01) | |
| *F16B 37/06* | (2006.01) | |

(52) U.S. Cl.
CPC .......... *B23K 11/26* (2013.01); *B23K 20/1295* (2013.01); *B23K 20/22* (2013.01); *B23K 26/323* (2015.10); *B23K 35/02* (2013.01); *B23K 35/0288* (2013.01); *B23K 35/304* (2013.01); *B23K 35/3033* (2013.01); *C22F 1/10* (2013.01); *B23K 2103/08* (2018.08); *B23K 2103/18* (2018.08); *B23K 2103/26* (2018.08); *F16B 37/061* (2013.01)

(56) References Cited

U.S. PATENT DOCUMENTS

| | | | | |
|---|---|---|---|---|
| 4,503,314 A | * | 3/1985 | Kakimi | B23K 35/0255 219/121.14 |
| 4,544,493 A | * | 10/1985 | Silvis | C07C 303/42 510/537 |
| 4,832,252 A | | 5/1989 | Fraser | |
| 4,904,137 A | * | 2/1990 | Matuschek | B21J 15/02 403/388 |
| 5,601,406 A | | 2/1997 | Chan | |
| 6,045,027 A | | 4/2000 | Rosen | |
| 2007/0181539 A1 | | 8/2007 | Richter | |
| 2010/0140321 A1 | * | 6/2010 | Eller | B23K 20/1245 228/2.1 |
| 2015/0078856 A1 | * | 3/2015 | Brennetot | B21J 15/022 411/43 |

FOREIGN PATENT DOCUMENTS

| | | |
|---|---|---|
| DE | 19613919 | 6/1997 |
| WO | 8805991 | 8/1988 |

OTHER PUBLICATIONS

Extended European Search Report dated Mar. 21, 2016 in European Application No. 15163894.7.
European Patent Office, European Office Action dated Nov. 28, 2018 in Application No. 15163894.7.
Maher Data Sheet http://www.maher.com/media/pdfs/718-datasheet.pdf May 31, 2017.
High Temperature Metals, http://www.hightempmetals.com/techdata/hitempInconel718data.php, Jul. 28, 2013.
USPTO; Pre-Interview Office Action dated Feb. 27, 2017 in U.S. Appl. No. 14/676,476.
USPTO; Non-Final Office Action dated Jun. 7, 2017 in U.S. Appl. No. 14/676,476.
USPTO; Final Office Action dated Oct. 30, 2017 in U.S. Appl. No. 14/676,476.
USPTO; Advisory Action dated Jan. 22, 2018 in U.S. Appl. No. 14/676,476.
USPTO; Non-Final Office Action dated May 15, 2018 in U.S. Appl. No. 14/676,476.
USPTO; Final Office Action dated Sep. 4, 2018 in U.S. Appl. No. 14/676,476.
USPTO; Advisory Action dated Nov. 21, 2018 in U.S. Appl. No. 14/676,476.
USPTO; Non-Final Office Action dated Dec. 20, 2018 in U.S. Appl. No. 14/676,476.
European Patent Office, European Partial Search Report dated Jul. 2, 2020 in Application No. 20167338.1.
European Patent Office, European Search Report dated Nov. 23, 2020 in Application No. 20167338.1.

\* cited by examiner

SYSTEMS AND METHODS FOR DISSIMILAR MATERIAL WELDING

CROSS-REFERENCE TO RELATED APPLICATIONS

This application is a Divisional of, claims priority to, and the benefit of U.S. Ser. No. 14/676,476 filed Apr. 1, 2015 and entitled "SYSTEMS AND METHODS FOR DISSIMILAR MATERIAL WELDING." The '476 application is a non-provisional of, and claims priority to, and the benefit of U.S. Provisional Application No. 62/013,381, filed Jun. 17, 2014 and entitled "SYSTEMS AND METHODS FOR DISSIMILAR MATERIAL WELDING," all of which are hereby incorporated by reference in their entirety for all purposes.

GOVERNMENT RIGHTS

The present disclosure was made with government support under Contract Number F33657-99-D-2051 awarded by the U.S. Air Force. The government has certain rights in the present disclosure.

FIELD

The present disclosure relates to systems and methods for dissimilar material welding.

BACKGROUND

Various components of an aircraft may be comprised of dissimilar materials, such as two different metal alloys. In certain applications, it may be advantageous to couple (e.g., weld or otherwise join) two dissimilar materials. However, various metal alloys may not be welded in a hardened state. As such, improved systems and methods for dissimilar material welding would be beneficial.

SUMMARY

In various embodiments, a system is provided comprising a hardened stud body and an unhardened stud subunit coupled to the hardened stud body. The hardened stud body may comprise a first composition having by weight between 17% and 21% chromium, between 2.8% and 3.3% molybdenum, between 50% to 55% nickel, and between 4.75% and 5.5% niobium. The unhardened stud subunit may comprise a second composition having by weight between 20% and 23% chromium, between 8% and 10% molybdenum, at least 58% nickel, and between 3.15% and 4.15% niobium. The first composition may conform to ASTM A1014/A1014M. The second composition may conform to ASTM B444. The hardened stud body may be formed from an unhardened stud body and the unhardened stud subunit may be coupled to the unhardened stud body. The unhardened stud body may undergo a heat treatment to become the hardened stud body. The unhardened stud subunit may be at least one of friction welded, inertia bonded, explosive welded, resistance welded, laser welded, gas tungsten arc welded, or brazed to an unhardened stud body. The unhardened stud subunit may be coupled to a substrate. The substrate may comprise a third composition having by weight between 20% and 23% chromium, between 8% and 10% molybdenum, at least 58% nickel, and between 3.15% and 4.15% niobium.

In various embodiments, a method is provided comprising welding an unhardened stud body comprising a first composition to an unhardened stud subunit comprising a second composition, to form a stud having an unhardened subunit portion and heat treating the stud. The first composition may comprise by weight between 17% and 21% chromium, between 2.8% and 3.3% molybdenum, between 50% to 55% nickel, and between 4.75% and 5.5% niobium. The second composition may comprise by weight between 20% and 23% chromium, between 8% and 10% molybdenum, at least 58% nickel, and between 3.15% and 4.15% niobium. The first composition may conform to ASTM A1014/A1014M. The second composition may conform to ASTM B444. The heat treating may comprise a precipitation heat treatment. The welding the unhardened stud body to the unhardened stud subunit may comprise at least one of friction welding, explosive welding, resistance welded, laser welding, or gas tungsten arc welding. The welding the stud to the substrate may comprise capacitor discharge welding. The substrate may comprise a third composition having by weight between 20% and 23% chromium, between 8% and 10% molybdenum, at least 58% nickel, and between 3.15% and 4.15% niobium. The method may further comprise welding the stud to a substrate, wherein a weld created by welding the stud to the substrate is located at least partially on the unhardened subunit portion.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only, and not to limit the disclosed embodiments. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

In various contexts, it may be desirable to weld a stud onto a substrate. For example, various nozzle liners of certain aircraft may include studs welded onto a substrate. It may be advantageous for the studs to have certain physical properties that may differ from those of the substrate. Accordingly, the studs may not be comprised entirely of the same material as the substrate. However, as various materials cannot be welded in a hardened state, it may be difficult to weld studs of a hardened material to a substrate of an unhardened material.

In that regard, the present inventors have discovered that a stud system may be created having a hardened stud body and an unhardened stud subunit coupled to the hardened stud body. The stud system may then be welded to a substrate at a point entirely on or near the unhardened stud subunit. The resulting structure has the benefits of the hardened study body, yet benefit from the strong and/or durable weld between the unhardened stud subunit and the substrate.

Figure 1:
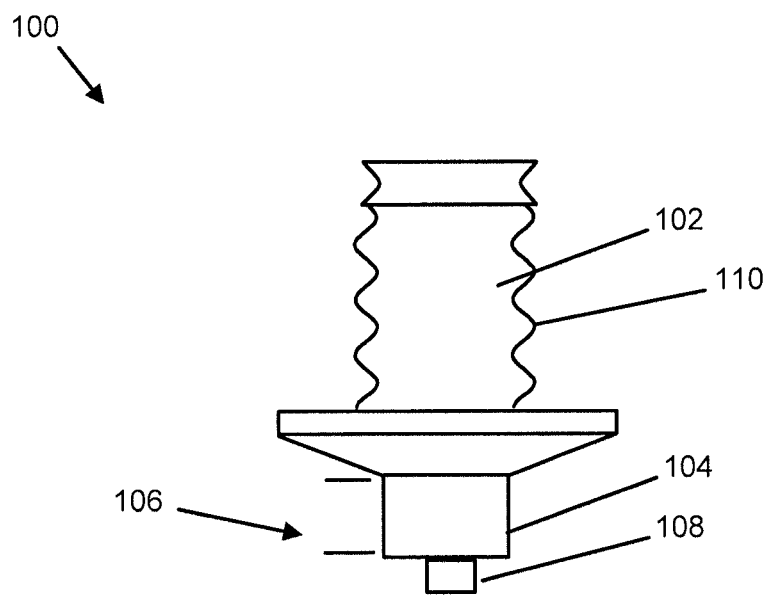
FIG. 1 illustrates a stud system in accordance with various embodiments.

With reference to FIG. 1, hardened stud body 102 is shown coupled to unhardened stud subunit 104. Length 106 represents the axial length of unhardened stud subunit 104. Ignition tip 108 may, in various embodiments, be attached to unhardened stud subunit 104 in preparation for capacitor discharge welding ("CDW"). In various embodiments, hardened stud body 102 comprises a first composition and unhardened stud subunit 104 comprises a second composition, wherein the first composition is different from the second composition. In various embodiments, hardened stud body 102 comprises a first composition that is hardenable. Stated another way, the first composition may have a hardened state and an unhardened state. The unhardened state may be transformed to the hardened state by, for example, heat treating the first composition. In that regard, as used herein, a "hardened state" may refer to a state of a composition that has undergone a heat treatment process and an "unhardened state" may refer to a state of a composition that is capable of undergoing a heat treatment process to enter a hardened state. In various embodiments, unhardened stud subunit 104 comprises a second composition that is not capable of hardening. In that regard, the second composition may not substantially change hardness after being subjected to a heat treatment. Stated another way, the second composition may be subjected to the hardening process that hardens the first composition without substantially changing physical properties of the second composition.

In various embodiments, hardened stud body 102 comprises an austenitic nickel-chromium-based alloy. For example, in various embodiments, hardened stud body 102 comprises a composition that by weight contains between 17% and 21% chromium, between 2.8% and 3.3% molybdenum, between 50% to 55% nickel, and between 4.75% and 5.5% niobium. Such a composition is sold commercially as INCONEL 718 by the Special Metals Corporation Huntington, W. Va., USA. INCONEL 718 conforms to the ASTM A1014/A1014M specification. As used herein, the term "Inconel 718" refers to a composition that by weight contains between 17% and 21% chromium, between 2.8% and 3.3% molybdenum, between 50% to 55% nickel, and between 4.75% and 5.5% niobium and that conforms to the ASTM A1014/A1014M specification. The term "INCONEL 718" (i.e., the term as stated with the word "INCONEL" in all capital letters) as used herein refers to the trademark used by Special Metals Corporation to refer to Inconel 718.

Inconel 718 is hardenable. Inconel 718 may be purchased in an unhardened state. Inconel 718 in the unhardened state may be welded using conventional techniques such as by gas tungsten arc welding ("TIG welding"). Inconel 718 in the hardened state may not be easily fabricated and/or welded.

Inconel 718 may be hardened by being subject to a heat treatment process. For example, a heat treatment may comprise a precipitation hardening, also referred to as age hardening and precipitation heat treatment. Inconel 718 is hardened by the precipitation of secondary phases (e.g. gamma prime and gamma double-prime) into the metal matrix. The precipitation of these nickel-(aluminum, titanium, niobium) phases may be induced by heat treating in the temperature range of 1100° F. to 1500° F. For this metallurgical reaction to properly take place, the aging constituents (aluminum, titanium, niobium) should be in solution (dissolved in the matrix); if they are precipitated as some other phase or are combined in some other form, they may not precipitate correctly. Inconel 718 may be readily fabricated (e.g., welded) in the unhardened state but may be difficult to fabricate after hardening.

In various embodiments, unhardened stud subunit 104 comprises an austenitic nickel-chromium-based alloy. For example, in various embodiments, unhardened stud subunit 104 comprises a composition having by weight between 20% and 23% chromium, between 8% and 10% molybdenum, at least 58% nickel, and between 3.15% and 4.15% niobium. Such a composition is sold commercially as INCONEL 625 by the Special Metals Corporation Huntington, W. Va., USA. INCONEL 625 conforms to the ASTM B444 specification. As used herein, the term "Inconel 625" refers to a composition that by weight between 20% and 23% chromium, between 8% and 10% molybdenum, at least 58% nickel, and between 3.15% and 4.15% niobium and that conforms to the ASTM B444 specification. The term "INCONEL 625" (i.e., the term as stated with the word "INCONEL" in all capital letters) as used herein refers to the trademark used by Special Metals Corporation to refer to Inconel 625. Inconel 625 is not considered hardenable in that heat treatment, such as the heat treatment used to harden Inconel 718, does not substantially harden Inconel 625.

Figure 2:
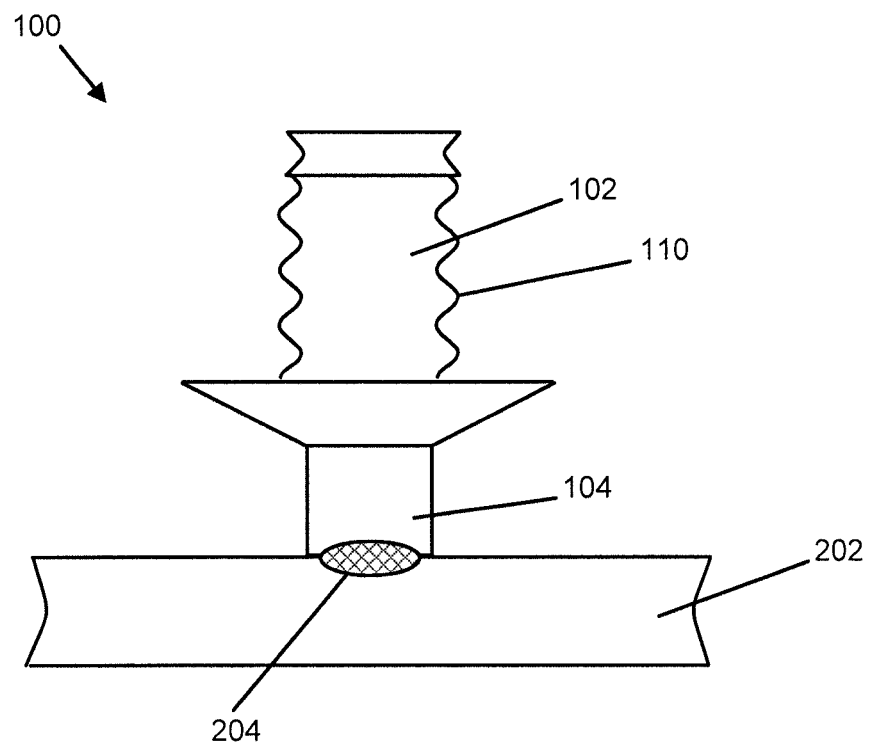
FIG. 2 illustrates a stud system welded to a substrate in accordance with various embodiments.

In various embodiments, hardened stud body 102 comprises mechanical retention feature 110. Mechanical retention feature 110 may comprise any feature capable of aiding and/or assisting in the mechanical retention of hardened stud body 102 to another structure. For example, mechanical retention feature 110 may comprises threads and/or swaging grooves and/or other mechanical retention features that may facilitate coupling hardened stud body 102 to another structure. In various embodiments, unhardened stud subunit 104 would be coupled to a portion of hardened stud body 102 that does not include a mechanical retention feature 110 so that the mechanical properties of the hardened stud body 102 are appropriately harnessed. For example, unhardened stud subunit 104 is not coupled to a portion of hardened stud body 102 that comprises mechanical retention feature 110. Instead, unhardened stud subunit 104 is positioned distal to mechanical retention feature 110 along length 106. In this regard, as depicted in FIG. 1 and FIG. 2, unhardened stud subunit 104 and mechanical retention feature 110 may be positioned at axially opposite ends of the stud system 100.

Figure 3:
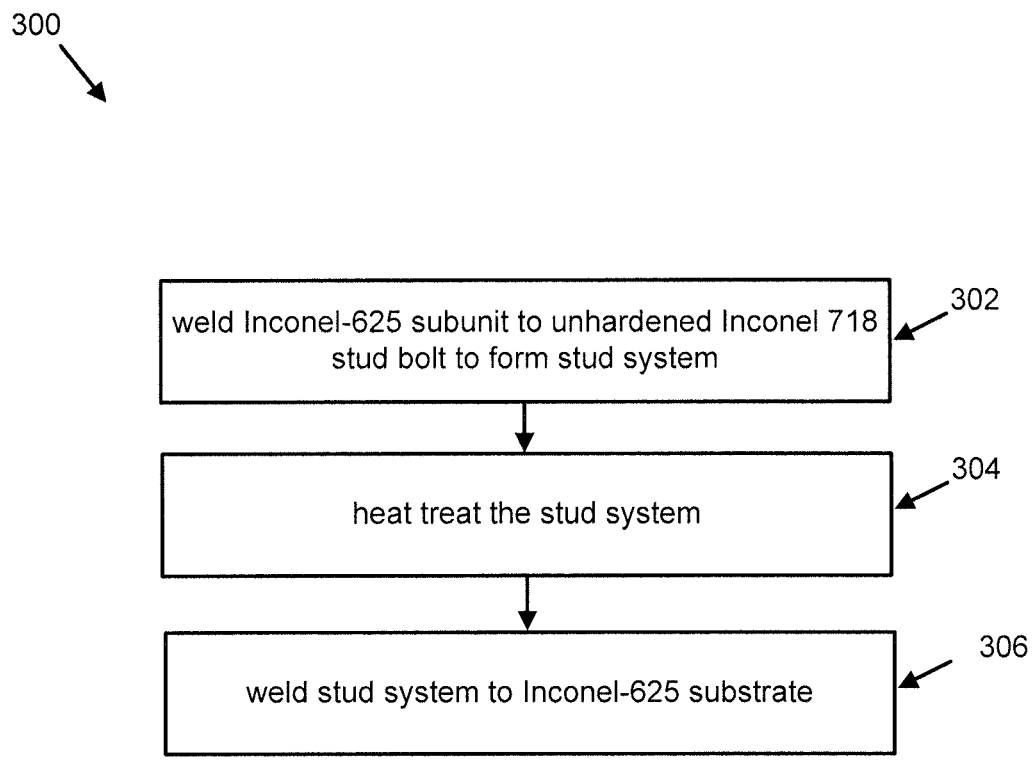
FIG. 3 illustrates a method in accordance with various embodiments.

With reference to FIG. 3, method 300 is illustrated. An unhardened stud body comprised of Inconel 718 may be welded to an unhardened stud subunit comprised of Inconel 625 to form a stud system (Step 302). In that regard, an unhardened stud body may comprise Inconel 718 in an unhardened state. Thus, the unhardened stud body may be easier to fabricate (i.e., weld). The welding may be TIG welding, as discussed above. In various embodiments, the TIG welding may comprise a welding method wherein a tungsten electrode is projected from the tip of a welding torch toward a weld zone of a base material. The welding torch may eject an inert gas such as argon or helium to form an inert gas shielding atmosphere in which an arc is produced between the electrode and the base material, whereby weld penetration of the base material is achieved and a filler wire is fed from or near the tip of the welding torch and melted. Any suitable method of coupling an unhardened stud body comprised of Inconel 718 to an unhardened stud subunit comprised of Inconel 625 is contemplated herein. For example, friction welding, inertia bonding, explosive welding, resistance welding, and/or laser welding, may be used to couple an unhardened stud body comprised of Inconel 718 to an unhardened stud subunit comprised of Inconel 625. In further embodiments, brazing may be used to couple an unhardened stud body comprised of Inconel 718 to an unhardened stud subunit comprised of Inconel 625. The stud system formed by Step 302 thus comprises an unhardened stud body and an unhardened stud subunit that are coupled by a weld.

The stud system may then be heat treated (Step 304). Any suitable heat treatment that would act to harden the Inconel 718 in the stud system is contemplated herein in Step 304. At least two heat treatments may be suitable to harden Inconel 718. In various embodiments, Inconel 718 may be heat treated at 1700-1850° F. followed by a rapid cooling, usually in water, plus precipitation hardening at 1325° F. for 8 hours, furnace cooled to 1150° F., held at 1150° F. for a total aging time of 18 hours, followed by air cooling. In further embodiments, Inconel 718 may be heat treated at 1900-1950° F. followed by rapid cooling, usually in water, plus precipitation hardening at 1400° F. for 10 hours, furnace cooled to 1200° F., held at 1200° F. for a total aging time of 20 hours, followed by air cooling. After Step 304, the stud system now comprises a hardened stud body and an unhardened stud subunit that are coupled by a weld.

The stud system is welded to a substrate (Step 306). For example, the substrate may be comprised of Inconel 625. In that regard, the location of the weld is at a physical juncture between the unhardened stud subunit of the stud system (which is made from Inconel 625) and the substrate (also made from Inconel 625). Thus, the weld of Inconel 625 to Inconel 625 may be strong and durable, while the hardened stud body provides the beneficial hardness properties of Inconel 718.

The weld in Step 306 may be a CDW. In CDW, electrical energy may be stored in one or more capacitors. The electrical energy may be released between a stud and a substrate. The heat generated by the electrical energy may cause a part of the stud and a part of the substrate to melt and weld together. An ignition tip may be used to facilitate this process.

Welding of the Inconel 625 may be more readily performed without a heat treatment to relieve stresses (i.e. stress relief). Performing stress relief on assembled components may be impractical as a result of distortion and/or thermal damage to certain components within the assembly. The weldment of Inconel 625 is less prone to micro-cracking during the welding process then weldments including the hardened Inconel 718.

With reference back to FIG. 2, stud system 100 is shown welded to substrate 202 at weld point 204. Substrate 202 may comprise Inconel 625, as unhardened stud subunit 104 may also comprise Inconel 625. In that regard, weld point 204 represents the juncture between the substrate 202 and the unhardened stud subunit 104, which may both comprise the same material. In this manner, the hardened, difficult to fabricate Inconel 718 of hardened stud body 102 is not connected in weld point 204, yet the stud system 100 still maintains the benefits of the hardened study body material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   welding an unhardened stud body comprising a first composition to an unhardened stud subunit comprising a second composition, to form a stud having an unhardened subunit portion;
   heat treating the stud, wherein the unhardened stud subunit remains unhardened after undergoing heat treatment, and the unhardened stud body is hardened after and in response to undergoing heat treatment;
   wherein the unhardened stud body comprises a mechanical retention feature; and
   the unhardened subunit portion is positioned distal to the mechanical retention feature.

2. The method of claim 1, wherein the first composition comprises by weight between 17% and 21% chromium, between 2.8% and 3.3% molybdenum, between 50% to 55% nickel, and between 4.75% and 5.5% niobium.

3. The method of claim 2, wherein the second composition comprises by weight between 20% and 23% chromium, between 8% and 10% molybdenum, at least 58% nickel, and between 3.15% and 4.15% niobium.

4. The method of claim 2, wherein the first composition conforms to ASTM A1014/A1014M.

5. The method of claim 3, wherein the second composition conforms to ASTM B444.

6. The method of claim 1, wherein the heat treating comprises a precipitation heat treatment.

7. The method of claim 1, wherein welding the unhardened stud body to the unhardened stud subunit comprises at least one of friction welding, explosive welding, resistance welded, laser welding, or gas tungsten arc welding.

8. The method of claim 1, further comprising welding the stud to a substrate, wherein welding the stud to the substrate comprises capacitor discharge welding.

9. The method of claim 8, wherein the substrate comprises a third composition having by weight between 20% and 23% chromium, between 8% and 10% molybdenum, at least 58% nickel, and between 3.15% and 4.15% niobium.

10. The method of claim 9, wherein a weld created by welding the unhardened stud subunit to the substrate is located at least partially on the unhardened subunit portion.

11. The method of claim 1, wherein the mechanical retention feature comprises at least one of threads and swaging grooves.

12. The method of claim 1, wherein the second composition is not capable of hardening by heat treatment.

13. The method of claim 1, wherein the stud extends axially.

14. The method of claim 1, wherein the unhardened subunit portion is positioned axially from the mechanical retention feature.

15. The method of claim 1, further comprising an ignition tip coupled to the unhardened stud subunit.

* * * * *